(12) United States Patent
Maaref et al.

(10) Patent No.: US 10,736,090 B2
(45) Date of Patent: Aug. 4, 2020

(54) SIGNALING INDICATION FOR FLEXIBLE NEW RADIO (NR) LONG TERM EVOLUTION (LTE) COEXISTENCE

(71) Applicant: Huawei Technologies Co., Ltd., Shenzhen (CN)

(72) Inventors: Amine Maaref, Kanata (CA); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/860,334

(22) Filed: Jan. 2, 2018

(65) Prior Publication Data

US 2018/0192404 A1 Jul. 5, 2018

Related U.S. Application Data

(60) Provisional application No. 62/442,852, filed on Jan. 5, 2017.

(51) Int. Cl.
*H04W 72/04* (2009.01)
*H04W 72/12* (2009.01)
(Continued)

(52) U.S. Cl.
CPC ......... *H04W 72/042* (2013.01); *H04L 5/0044* (2013.01); *H04L 5/0048* (2013.01);
(Continued)

(58) Field of Classification Search
CPC ... H04L 5/0044; H04L 5/0048; H04L 5/0053; H04L 5/0094; H04W 16/14;
(Continued)

(56) References Cited

U.S. PATENT DOCUMENTS

2014/0334435 A1* 11/2014 Al-Shalash ........... H04W 8/005
370/330
2015/0067435 A1* 3/2015 Yerramalli ............ H04L 1/0006
714/748
(Continued)

FOREIGN PATENT DOCUMENTS

CN 105075365 A 11/2015
CN 105493426 A 4/2016
(Continued)

OTHER PUBLICATIONS

3GPP TSG RAN WG1 #85 R1-164020, "Co-existence of LTE and NR", Samsung, May 23-27, 2016, 4 pages.
(Continued)

*Primary Examiner* — Mewale A Ambaye
(74) *Attorney, Agent, or Firm* — Slater Matsil, LLP

(57) ABSTRACT

A New Radio (NR) control signal that indicates one or more Long Term Evolution (LTE) network parameters may be transmitted to NR UEs to enable the NR UEs to identify which resources carry LTE signal(s). The NR UEs may then receive one or more NR downlink signals over remaining resources in a set of resources without processing those resources that carry LTE signal(s). The NR downlink signals may have a zero power level, or otherwise be blanked, over resources that carry the LTE signal(s).

44 Claims, 11 Drawing Sheets

(51) Int. Cl.
  *H04L 5/00* (2006.01)
  *H04W 16/14* (2009.01)
  *H04W 74/00* (2009.01)
  *H04W 88/06* (2009.01)
(52) U.S. Cl.
  CPC .......... *H04L 5/0053* (2013.01); *H04L 5/0094* (2013.01); *H04W 72/0453* (2013.01); *H04W 72/1215* (2013.01); *H04W 16/14* (2013.01); *H04W 72/1289* (2013.01); *H04W 74/006* (2013.01); *H04W 88/06* (2013.01)
(58) Field of Classification Search
  CPC .......... H04W 72/042; H04W 72/0453; H04W 72/1215; H04W 72/1289; H04W 74/006
  See application file for complete search history.

(56) References Cited

U.S. PATENT DOCUMENTS

| | | |
|---|---|---|
| 2015/0215905 A1 | 7/2015 | Park et al. |
| 2016/0028521 A1* | 1/2016 | Shimezawa ............ H04J 11/005 370/329 |
| 2016/0360551 A1 | 12/2016 | Bergman et al. |
| 2017/0134080 A1* | 5/2017 | Rahman ................ H04B 7/0456 |
| 2017/0195081 A1 | 7/2017 | Yerramalli et al. |
| 2017/0332437 A1 | 11/2017 | Yamada |
| 2018/0007583 A1 | 1/2018 | Hong et al. |
| 2018/0227031 A1* | 8/2018 | Guo ..................... H04B 7/0626 |
| 2018/0227918 A1* | 8/2018 | Yun .................... H04W 72/0453 |
| 2018/0324678 A1* | 11/2018 | Chen ................... H04W 48/10 |
| 2019/0045529 A1* | 2/2019 | Xiong ............... H04W 72/1284 |

FOREIGN PATENT DOCUMENTS

| | | |
|---|---|---|
| CN | 106165488 A | 11/2016 |
| CN | 106231637 A | 12/2016 |
| WO | 2015009075 A | 1/2015 |

OTHER PUBLICATIONS

3GPP TSG RAN WG1 Meeting #86 R1-166556, "Requirements and solutions for LTE/NR coexistence", Intel Corporation, Aug. 22-26, 2016, 7 pages.

* cited by examiner ations, and in particular embodiments, to systems and
SIGNALING INDICATION FOR FLEXIBLE NEW RADIO (NR) LONG TERM EVOLUTION (LTE) COEXISTENCE This application claims priority to U.S. Provisional Patent Application 62/442,852 filed on Jan. 5, 2017 and entitled "Signal Indication for Flexible New Radio (NR) Long Term Evolution (LTE) Coexistence," which is incorporated herein by reference as if reproduced in its entirety.

TECHNICAL FIELD

The present disclosure relates generally to telecommunications, and in particular embodiments, to systems and methods for Signal Indication for Flexible New Radio (NR) Long Term Evolution (LTE) Coexistence.

BACKGROUND

New Radio (NR) is a proposed Fifth Generation (5G) wireless telecommunication protocol that will offer unified connectivity for smartphones, cars, utility meters, wearables and other wirelessly enabled devices. 5G NR wireless networks may have the capability to dynamically re-purpose unused bandwidth of Fourth Generation (4G) Long Term Evolution (LTE) wireless networks. In this way, NR and LTE air interfaces may coexist over the same spectrum.

SUMMARY

Technical advantages are generally achieved, by embodiments of this disclosure which describe techniques for a unifying message to support Signal Indication for Flexible New Radio (NR) Long Term Evolution (LTE) Coexistence.

In accordance with an embodiment, a method for receiving signals is provided. In this embodiment, the method includes receiving a New Radio (NR) control signal indicating a Long Term Evolution (LTE) network parameter, determining, based on the LTE network parameter, a subset of resources carrying LTE signal(s), and receiving an NR downlink signal over one or more remaining resources in a set of resources. In one example, the set of resources include resources that are allocated to the UE. In the same example, or in another example, the set of resources include control resource sets configured to the UE. In any one of the preceding examples, or in another example, the NR downlink signal is rate matched around the subset of resources carrying the LTE signal(s). In any one of the preceding examples, or in another example, the NR downlink signal is rate matched at the resource element (RE) level such that the subset of resources around which the NR downlink signal is rate matched consists of an integer number of resource elements (REs). In any one of the preceding examples, or in another example, the NR control signal indicates an LTE antenna port. In such an example, determining the subset of resources carrying LTE signal(s) may include determining that the subset of resources includes resources carrying LTE reference signal(s) based on an LTE cell-specific reference signal (CRS) pattern associated with the LTE antenna port. In any one of the preceding examples, or in another example, the NR control signal indicates a frequency offset. In such an example, determining the subset of resources carrying LTE signal(s) may include determining that the subset of resources includes resources carrying LTE reference signal(s) based on the frequency offset. In any one of the preceding examples, or in another example, the NR control signal indicates a number of Orthogonal Frequency Division Multiplexed (OFDM) symbols in an LTE control channel. In such an example, receiving the NR downlink signal over one or more remaining resources in the set of resources my include adjusting the start time for receiving an NR downlink signal for a period of time corresponding to the number of OFDM symbols in the LTE control channel. In any one of the preceding examples, or in another example, the NR control signal indicates an LTE Multicast-Broadcast Single-Frequency Network (MBSFN) configuration. In such an example, determining the subset of resources carrying LTE signal(s) may include determining that the subset of resources includes resources carrying LTE MBSFN reference signal(s) based on the LTE MBSFN configuration. In any one of the preceding examples, or in another example, the NR control signal indicates an LTE Channel State Information Reference Signal (CSI-RS) configuration. In such an example, determining the subset of resources carrying LTE signal(s) may include determining that the subset of resources includes resources carrying LTE CSI-RS signal(s) based on the LTE CSI-RS configuration. In any one of the preceding examples, or in another example, receiving the NR downlink signal includes receiving one or more NR downlink signal(s) over the one or more remaining resources, where the one or more NR downlink signals have zero power levels over the subset of resources carrying the LTE signal(s). In such an example, the one or more NR downlink signals may include an NR signal transmitted over a Physical Downlink Shared Channel (PDSCH), an NR control signal transmitted over a Physical Downlink Control Channel (PDCCH), an NR primary or secondary synchronization signal, an NR broadcast signal transmitted over an NR Physical Broadcast Channel (PBCH), or a combination thereof. In any one of the preceding examples, or in another example, the NR control signal is received over an NR downlink physical control channel. In any one of the preceding examples, or in another example, the NR control signal is received over an NR physical broadcast channel (PBCH). In any one of the preceding examples, or in another example, the NR control signal is included in remaining minimum system information (RMSI). In any one of the preceding examples, or in another example, the NR control signal is conveyed by a higher-layer Radio Resource Control (RRC) signal. In any one of the preceding examples, or in another example, the NR control signal is conveyed by a Media Access Control (MAC) control element (CE). In any one of the preceding examples, or in another example, the NR control signal is conveyed by a combination of higher-layer Radio Resource Control (RRC) signal and a Media Access Control (MAC) control element (CE). An apparatus for performing this method is also provided.

In accordance with another embodiment, a method of transmitting signals is provided. In this embodiment, the method includes receiving a New Radio (NR) control signal indicating a Long Term Evolution (LTE) network parameter, determining, based on the LTE network parameter, a subset of resources carrying, or otherwise reserved for, LTE signal(s), and transmitting an NR uplink signal over one or more remaining resources in a set of resources without transmitting the NR uplink signal over the subset of resources carrying, or otherwise reserved for, the LTE signal(s). In one example, the set of resources are allocated to the UE. In the same example, or in another example, the set of resources include resources configured for uplink control signals. In any one of the preceding examples, or in another example, the NR uplink signal is rate matched around the subset of resources carrying, or otherwise reserved for, the LTE signal. In any one of the preceding examples, or in another example, determining the subset of resources carrying LTE signal(s) may include determining that at least some resources in the subset of resources are reserved for LTE Random Access Channel (RACH) transmissions based on the LTE network parameter in the NR control signal. In any one of the preceding examples, or in another example, determining the subset of resources carrying LTE signal(s) may include determining that at least some resources in the subset of resources carry LTE sounding reference signal (SRS) symbols based on the LTE network parameter in the NR control signal. In any one of the preceding examples, or in another example, determining the subset of resources carrying LTE signal(s) may include determining that at least some resources in the subset of resources carry LTE data signal transmitted over an NR physical uplink channel (PUSCH) or an NR control signal transmitted over an NR physical uplink control channel (PUCCH) based on the LTE network parameter in the NR control signal.

BRIEF DESCRIPTION OF THE DRAWINGS

For a more complete understanding of this disclosure, and the advantages thereof, reference is now made to the following description taken in conjunction with the accompanying drawings, in which.

DETAILED DESCRIPTION OF ILLUSTRATIVE EMBODIMENTS

Figure 1:
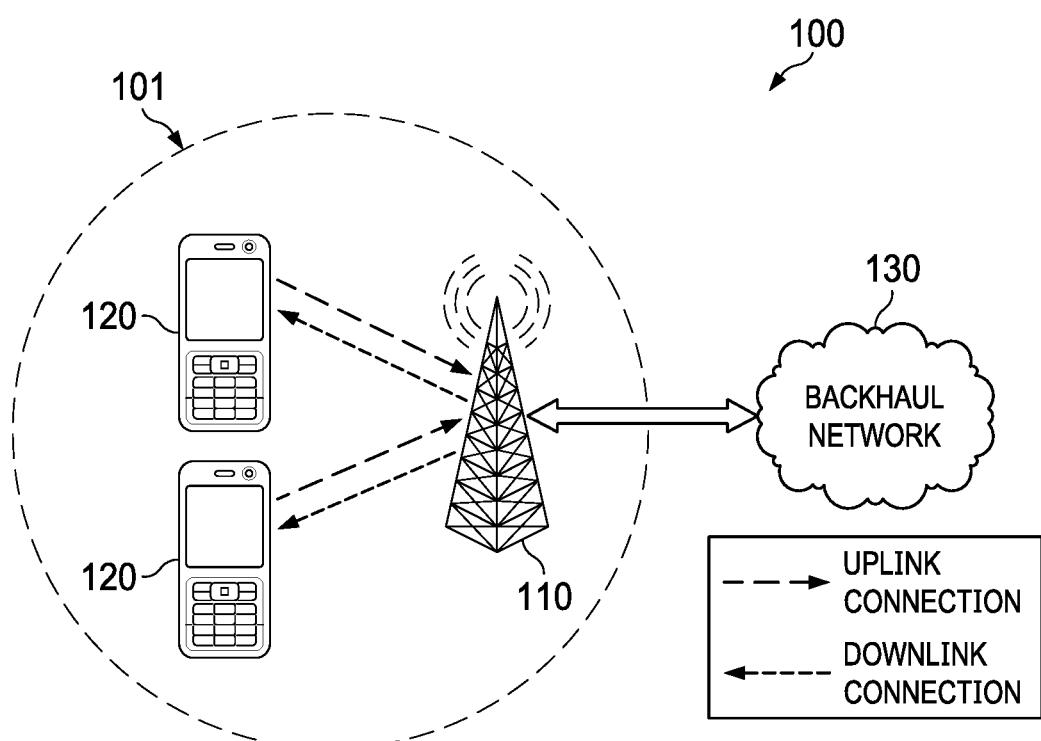
FIG. 1 is a diagram of an embodiment wireless communications network.

The structure, manufacture and use of embodiments are discussed in detail below. It should be appreciated, however, that this disclosure provides many applicable claimed concepts that can be embodied in a wide variety of specific contexts. The specific embodiments discussed are merely illustrative of specific ways to make and use the claimed concepts, and do not limit the claimed concepts.

It should be appreciated that "LTE signal(s)" refers to any signal(s)transmitted according to the LTE family of telecommunication protocols, including (but not limited to) LTE data signal(s) transmitted over an LTE physical downlink shared channel (PDSCH) or LTE physical uplink shared channel (PU-SCH), LTE control signal(s) transmitted over an LTE physical downlink control channel (PDCCH) or LTE enhanced PDCCH (ePDCCH) or LTE physical uplink control channel (PUCCH), and LTE reference signal(s) (e.g., channel state information reference signal (CSI-RS), common reference signal (CRS), demodulation reference symbols (DMRS), primary and secondary synchronization signal(s), etc.), as well as LTE signal(s) communicated over an LTE Physical Broadcast Channel (PBCH), an LTE Radio Resource Control (RRC) higher layer protocol, and/or an LTE Media Access Control (MAC) control element (CE). Likewise, "NR signal" refers to any signal transmitted according to the NR family of telecommunication protocols, including (but not limited to) NR data signal(s) transmitted over an NR PDSCH or NR PUSCH, NR control signal(s) transmitted over an NR PDCCH, or NR PUCCH, and NR reference signal(s), as well as other NR signal(s) communicated over an NR PBCH, an NR RRC higher layer protocol, and/or an NR MAC control element. As used herein, the term "NR control signal" may refer to any control signal transmitted according to the NR family of telecommunication protocols, including (but not limited to) RRC signal(s), MAC control elements (CEs), and downlink control information (DCI), control signal(s) communicated over a PBCH, and remaining minimum system information (RMSI), as well as any other cell-specific, group-specific, and/or UE-specific control signal(s). An RMSI may include specific minimum system information that is not transmitted in the PBCH. The RMSI may be transmitted over a PDSCH. The PDSCH resources over which the RMSI is transmitted may be identified by a DCI message transmitted over a common search space in the PDCCH. The DCI message may be CRC is masked by a common RNTI, such as a system information RNTI (SI-RNTI). The term "LTE network parameter" refers to any control or management information that can be used to identify which resources carry LTE signal(s), including (but not limited to) antenna port configuration, physical control channel format indicator such as information carried in LTE PCFICH, frequency shift or offset, LTE subframe configuration, MBSFN configuration, CSI RS configuration, reference signal resource element location, control channel resources, etc. It should be appreciated that the terms "signal", "signal(s)", and "signals" are used interchangeably throughout to refer to one or more signals, and that none of those terms should be construed as referring to a single signal to the exclusion of multiple signals, or to multiple signals to the exclusion of a single signal, unless otherwise specified.

Downlink data channel resources of an LTE subframe may go unused when LTE network capacity exceeds spectrum demand of LTE user equipments (UEs), as may commonly occur in-between peak usage periods of the LTE network. In some instances, 5G NR wireless networks may dynamically allocate unused data channel resources of an LTE subframe to 5G NR UEs. However, even when data channel resources of an LTE subframe are not being used to carry LTE signal(s), the LTE subframe may nevertheless carry control and reference signal to LTE UEs. The LTE control and reference signal may interfere with the reception of an NR downlink transmission by NR UEs if the resources carrying the LTE control/reference signal are processed by the NR UEs. However, the number of orthogonal frequency division multiplexed (OFDM) symbols in a physical downlink control channel (PDCCH) in an LTE subframe, as well as the resource element (RE) locations that are used to carry reference signal(s) in the LTE subframe, vary depending on the LTE subframe configuration. Accordingly, techniques for notifying NR UEs about which resources carry LTE signal(s) are needed to achieve seamless coexistence of the NR and LTE air interfaces.

Embodiments of this disclosure transmit NR control signal that indicates one or more LTE network parameters to NR UEs to enable the NR UEs to identify which resources carry LTE signal(s). The NR UEs may then receive one or more NR downlink signal(s) or channels over remaining resources in a set of resources. The set of resources may include grant-based resources allocated to the UE and/or grant-free resources which may be semi-statically configured to the UE. The NR downlink signal(s) or channels may have a zero power level, or otherwise be blanked, over resources that carry the LTE signal(s). The NR downlink signal(s) may include NR data or control channels, e.g. a NR Physical Downlink Shared Channel (PDSCH), a NR Physical Downlink Control Channel (PDCCH), an NR primary or secondary synchronization signal, a Physical Broadcast Channel (PBCH), or a combination thereof. In one embodiment, the NR control signal indicates an LTE antenna port, and the NR UE determines which resources carry LTE reference signal(s) based on an LTE common reference signal (CRS) pattern associated with the LTE antenna port. In such embodiments, the mapping of the LTE CRS patterns to LTE antenna ports may be a priori information of the NR UE. In another embodiment, the NR control signal indicates a control channel format including a number of orthogonal frequency division multiplexed (OFDM) symbols in an LTE subframe that are used to carry LTE control channel, e.g. PDCCH. In such embodiments, the NR UE may adjust a start time for processing an NR downlink signal or channel for a period of time corresponding to the number of OFDM symbols in the LTE control channel. The time offset for adjusting the transmission time of the NR downlink signal can be indicated in NR PDCCH. In another embodiment, the NR control signal may indicate a frequency offset to adjust for frequency misalignment due to different handling of DC subcarrier in NR and LTE or to provide cell-specific interference randomization benefits. In another embodiment, fractional PRBs may be used in NR to address potential frequency misalignment due to different handling of DC subcarriers in LTE and NR. In another embodiment, the NR control signal indicates a number of orthogonal frequency division multiplexed (OFDM) symbols that are occupied by LTE reference signal(s). In such embodiments, the NR UE may skip the symbols corresponding to the number of OFDM symbols in the LTE symbols indicated by the NR control signal when processing an NR downlink signal or transmitting a NR uplink signal. In another embodiment, NR demodulation reference signal (DM-RS) is mapped to a set of time-frequency resource elements (REs) that avoid LTE reference signal(s). In yet another embodiment, the NR control signal indicates a physical cell identifier (ID) of the base station, and the UE may identify resources carrying LTE reference signal based on a frequency offset associated with the physical cell ID.

In yet another embodiment, the NR control signal indicates an LTE Multicast-broadcast single-frequency network (MBSFN) configuration, and the NR UE determines which resources carry LTE MBSFN reference signal(s) based on the LTE MBSFN configuration. In such embodiments, the mapping of resource elements to LTE MBSFN reference signal(s) for different LTE MBSFN configurations may be a priori information of the NR UE. In yet another embodiment, the NR control signal indicates an LTE channel state information reference signal (CSI-RS) configuration, and the NR UE determines which resources carry LTE CSI-RS signal (e.g., non-zero power (NZP) CSI-RS symbols) based on the LTE CSI-RS configuration. In such embodiments, the mapping of resource elements to LTE CSI-RS signal(s) for different LTE CSI-RS configurations may be a priori information of the NR UE. The NR control signal may be NR layer one (L1) signal (e.g., dynamic downlink control information (DCI) in an NR downlink physical control channel). Alternatively, the NR control signal that indicates the LTE parameter may be received over an NR broadcast channel. As yet another alternative, the NR control signal that indicates the LTE parameter may be received over a higher-layer control channel, such as a UE-specific radio resource control (RRC) signal or media access control (MAC) control element.

It should be appreciated that NR control signal may be used to notify NR UEs of uplink resources that carry LTE signal(s). For example, an NR UE may receive an NR control signal indicating an LTE parameter, determine resources that carry, or are otherwise reserved for, LTE uplink signal(s) based on the LTE parameter, and then transmit an NR uplink signal over one or more remaining resources in a set of resources without transmitting the NR uplink signal over those resources that carry the uplink LTE signal(s). The NR control signal may identify resources reserved for LTE Random Access Channel (RACH) uplink transmissions, LTE sounding reference signal (SRS) symbols, physical uplink shared channel (PUSCH), physical uplink control channel (PUCCH), or combinations thereof. These and other features are described in greater detail below.

FIG. 1 is a network 100 for communicating data. The network 100 comprises a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a base station (BS) or transmit/receive point (TRP), a macro-cell, a femtocell, a Wi-Fi access point (AP), or other wirelessly enabled devices. Base stations may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as 4G or fifth generation (5G) LTE UE, a NR UE, a mobile station (STA), and other wirelessly enabled devices. In some embodiments, the network 100 may comprise various other wireless devices, such as relays, low power nodes, etc.

Figure 2:
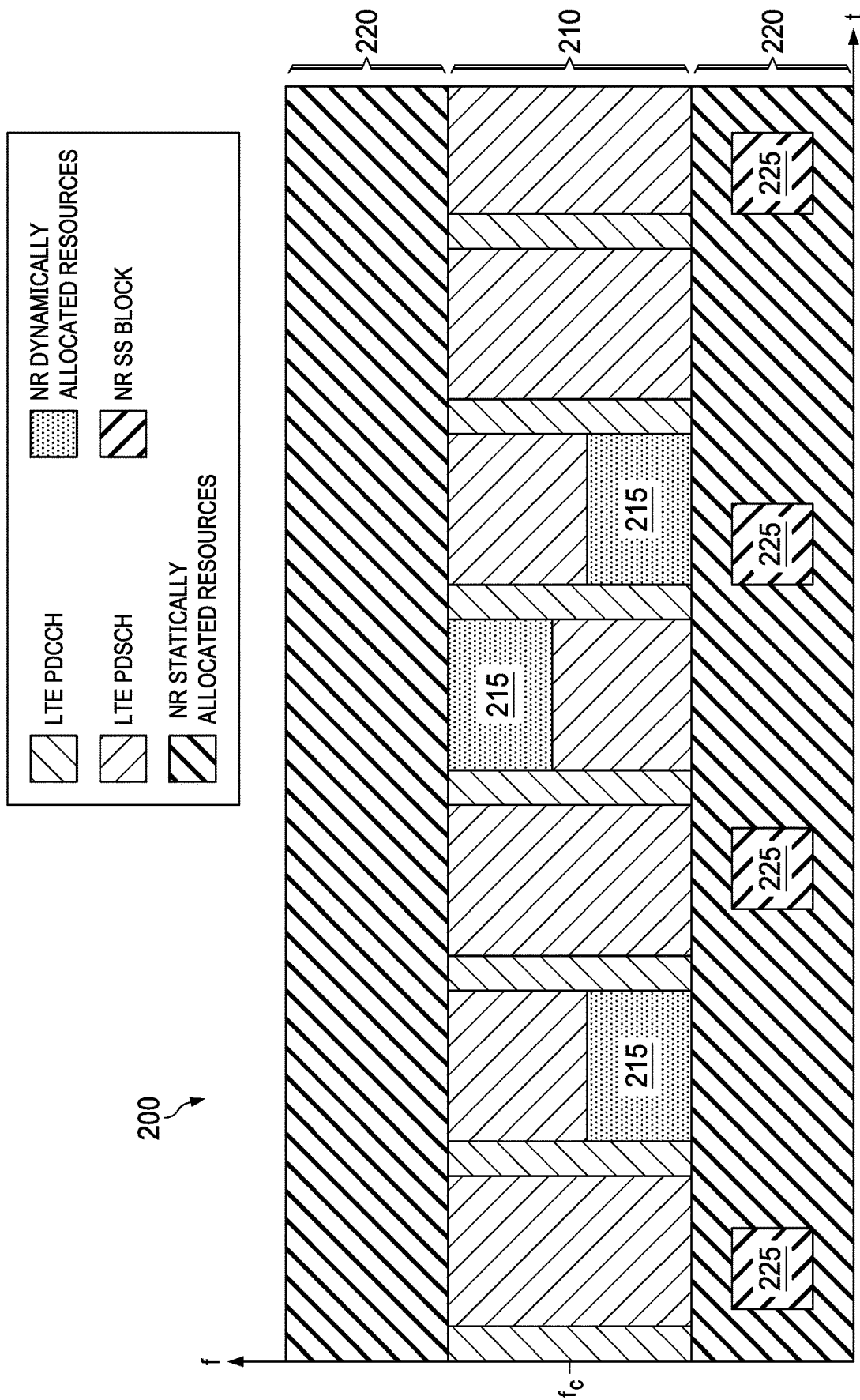
FIG. 2 is a diagram of a spectrum configured for the coexistence of NR and LTE air interfaces.

Unused resources of a downlink LTE subframe can be re-allocated to carry NR downlink signal/data to one or more NR UEs. FIG. 2 is a diagram of a spectrum 200 configured for the coexistence of NR and LTE air interfaces. A central portion 210 of the spectrum 200 is licensed for LTE signal(s), and outer portions 220 of the spectrum 200 are statically allocated for NR signal. As shown, some resources of the central portion 210 of the spectrum 200 are used for LTE physical downlink control channel (PDCCH) signal and LTE physical downlink shared channel (PDSCH) signal. In this example, sets of resources 215 of the central portion 210 of the spectrum 200 that are not used for LTE PDCCH or LTE PDSCH are dynamically allocated for NR signal.

Figure 3A:
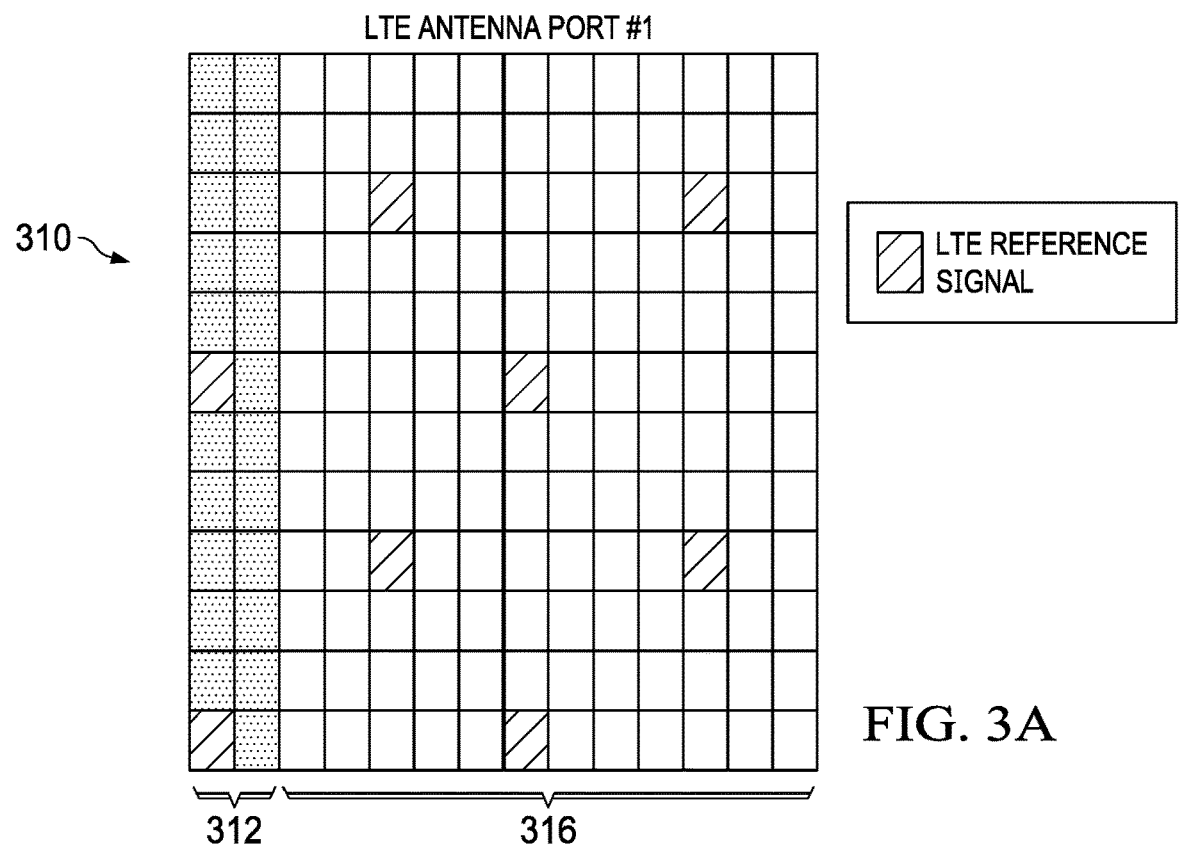
FIGS. 3A-3C are diagrams of LTE reference signal patterns for different LTE antenna port configurations.
Figure 3B:
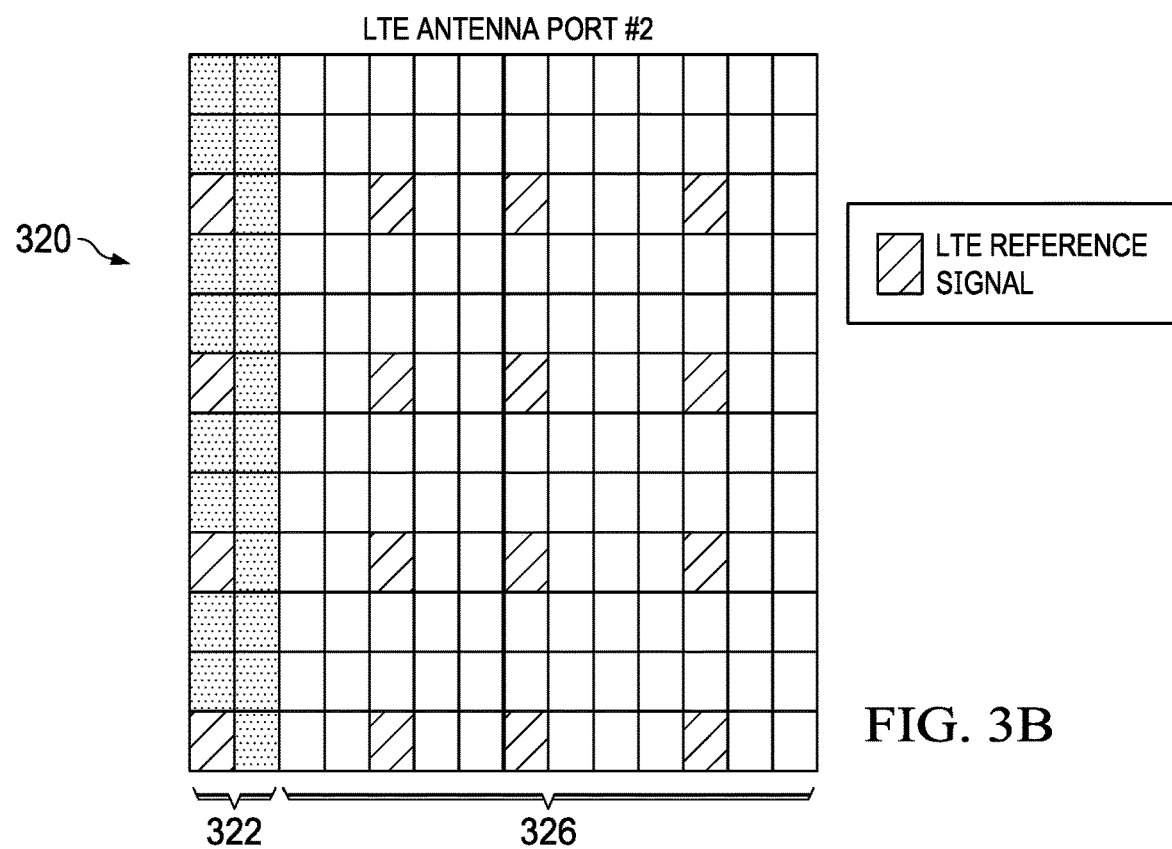
Figure 3C:
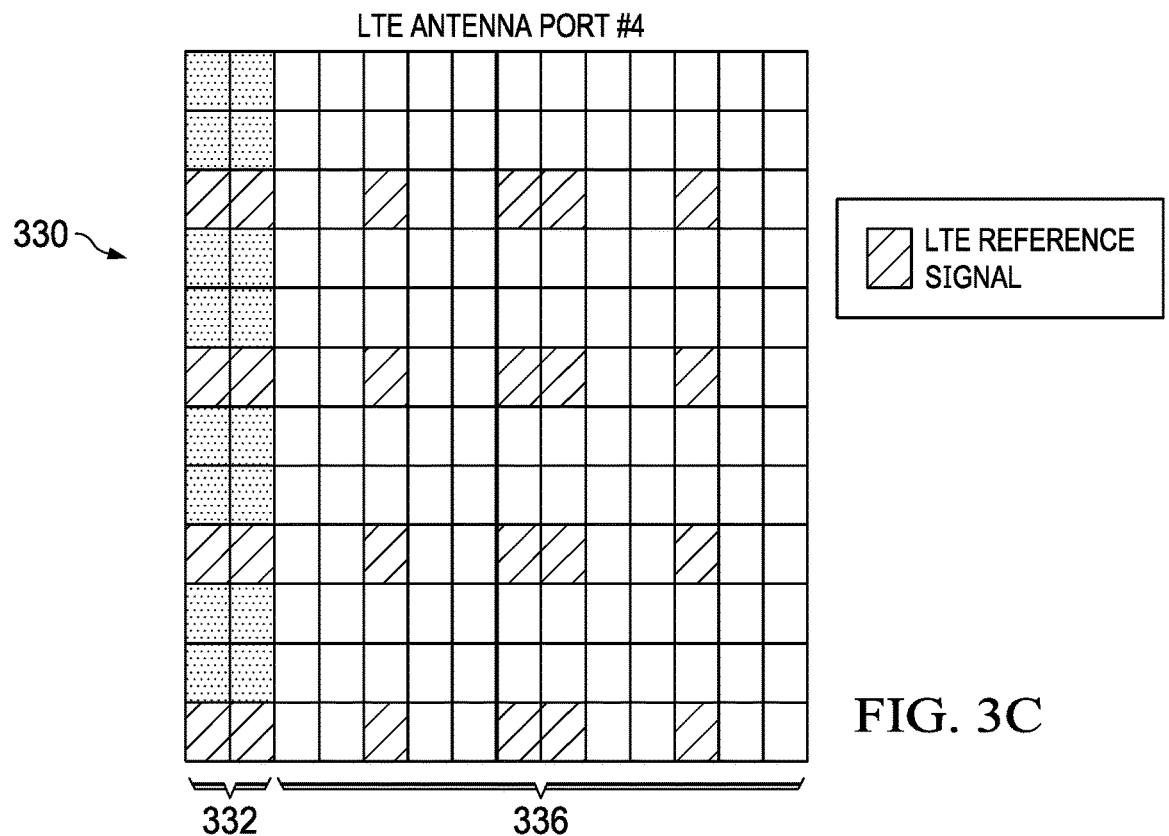

There may be resource elements (REs) within the sets of resources 215 that carry LTE reference signal. The RE locations within the sets of resources 215 may vary based on an LTE common reference signal (CRS) pattern associated with one or multiple antenna ports used to transmit the LTE reference signal(s). FIGS. 3A-3C are diagrams of RE locations used to carry LTE reference signal for different antenna patterns. In some embodiments, NR synchronization signal (SS) blocks 225 are communicated in the outer portions 220 of the spectrum 200. In particular, FIG. 3A is a diagram of an LTE CRS pattern 310 for LTE antenna port #1, FIG. 3B is a diagram of an LTE CRS pattern 320 for LTE antenna port #2, and FIG. 3C is a diagram of an LTE CRS pattern 330 for LTE antenna port #4. It should be appreciated that the LTE CRS patterns 310, 320, 330 represent a few examples of the possible LTE CRS patterns, and that different LTE antenna ports (e.g., antenna port #0, antenna port #3, antenna port #5, . . . antenna port #22, etc.) may be associated with different CRS antenna patterns.

In some embodiments, NR UEs and/or NR access points may perform rate matching in sets of resources 215 of the central portion 210 of the spectrum 200 that are dynamically allocated for NR signal to compensate for resources that carry LTE control or reference signal. Rate matching may be performed by increasing the coding rate on remaining resources to compensate for blanking, or otherwise not transmitting/receiving NR signal(s), over a subset of resources that carry LTE signal(s). Moreover, the fact that resources in the central portion 210 of the spectrum 200 are used to carry NR data and/or control channels may be transparent to LTE UEs.

Figure 4:
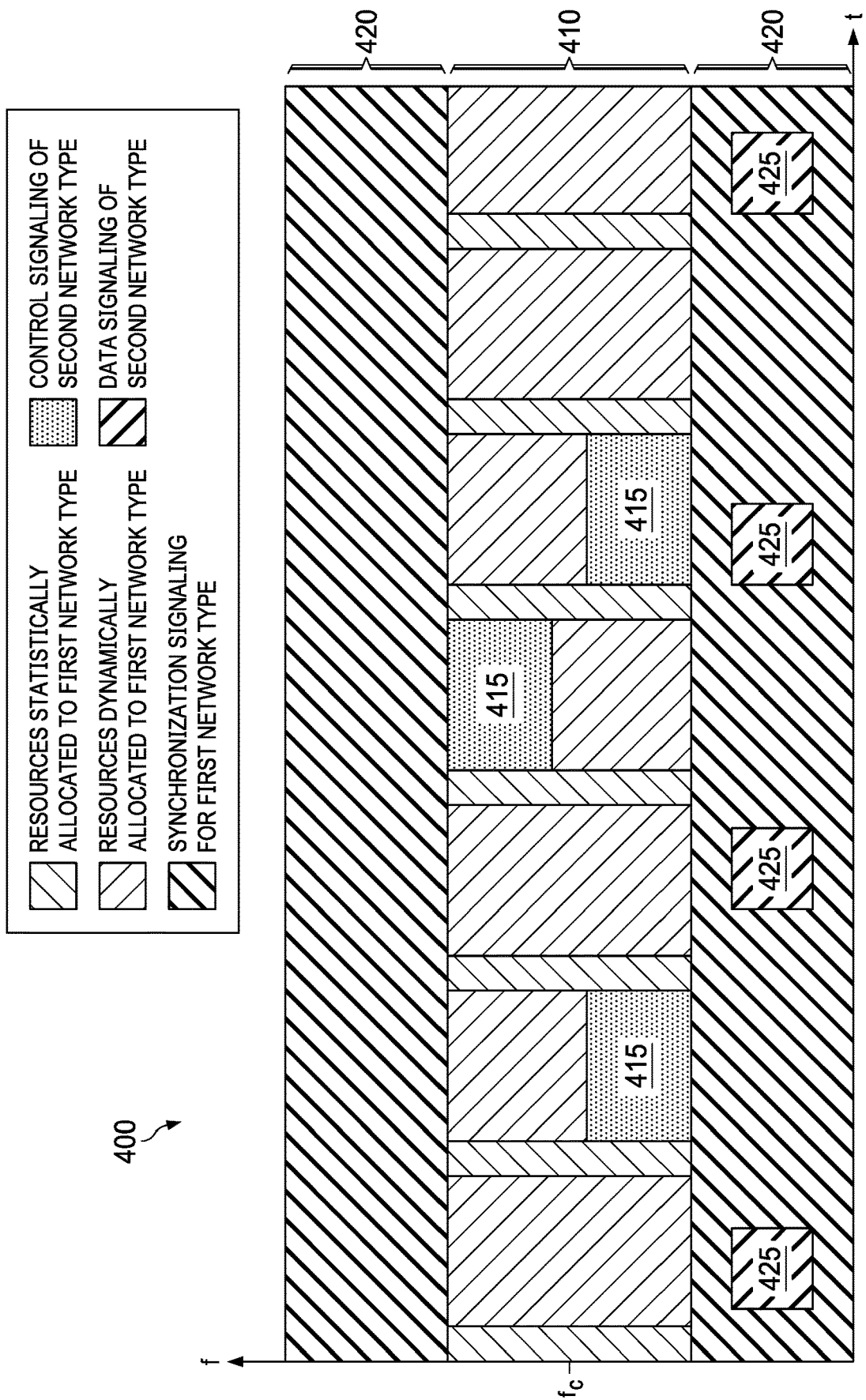
FIG. 4 is a diagram of a spectrum configured for the coexistence of air interfaces associated with two different network types.

Although much of this disclosure discusses embodiment techniques that allow an NR UE to receive an NR downlink signal or channel over unused resources of an LTE subframe, it should be appreciated that those embodiment techniques can be adapted for use in other types of networks as well. FIG. 4 is a diagram of a spectrum 400 configured for the coexistence of air interfaces associated with two different network types. In particular, the spectrum 400 includes a central portion 410 and two outer portions, 420. The outer portions 420 of the spectrum 400 are statically allocated for downlink signal associated with a first network type. The central portion 410 of the spectrum 400 is licensed for downlink signal of a second network type that is different than the first network type. Semi-static or dynamic resizing of the central portion of the bandwidth associated with the second network type is also possible in some embodiments. As shown, some resources of the central portion 410 of the spectrum 400 are used for control signal of the second network type, and other resources of the central portion 410 of the spectrum are used for data signal of the second network type. In this example, sets of resources 415 of the central portion 410 of the spectrum 400 that are not used for data or control signal of the second network type are dynamically allocated for downlink signal of the first network type.

Figure 5:
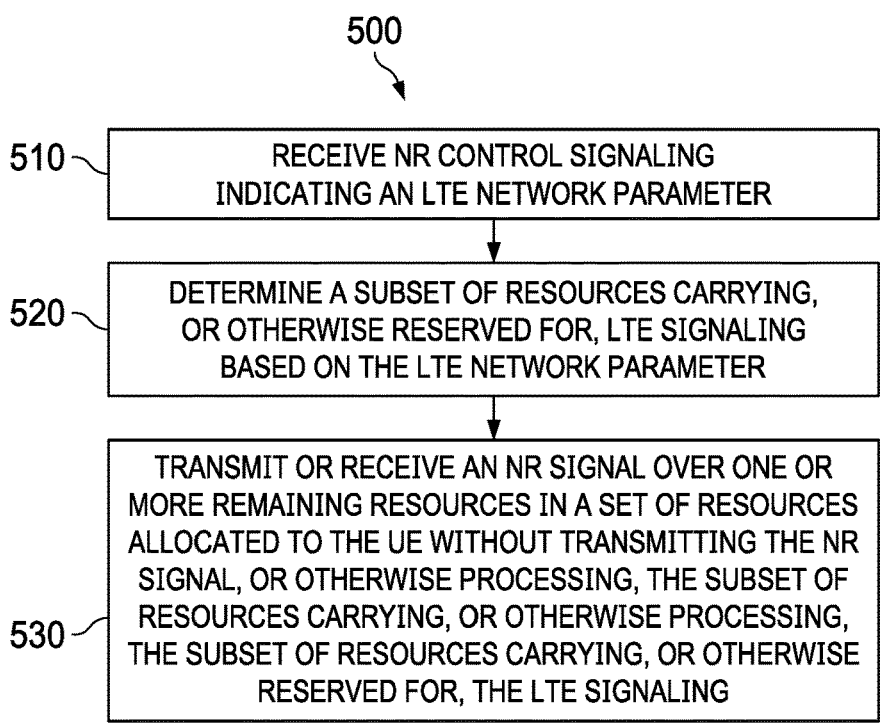
FIG. 5 is a flowchart of an embodiment method for transmitting or receiving an NR signal over LTE resources.

Similar to the NR/LTE specific embodiments discussed above, there may be REs within the sets of resources 415 that carry reference and/or control signal for the second network type. Those locations of the resources within the sets of resources 415 that carry reference signal of the second network type may vary based on a network parameter associated with the second network type, and it may be beneficial to notify UEs associated with the first network type of this parameter so that they can avoid processing REs carrying signal associated with the second network type when receiving a downlink signal associated with the first network type. In some embodiments, synchronization signal 425 for the second network type is communicated in the outer portions 420 of the spectrum 400. FIG. 5 is a flowchart of an embodiment method 500 for transmitting or receiving an NR signal over LTE resources, as may be performed by a UE. At step 510, the UE receives NR control signal indicating an LTE network parameter. At step 520, the UE determines a subset of resources carrying, or otherwise reserved for, LTE signal(s) based on the LTE network parameter. At step 530, the UE transmits or receives an NR signal over one or more remaining resources in a set of resources allocated to the UE without transmitting the NR signal, or otherwise processing, the subset of resources carrying, or otherwise reserved for, the LTE signal(s).

Figure 6:
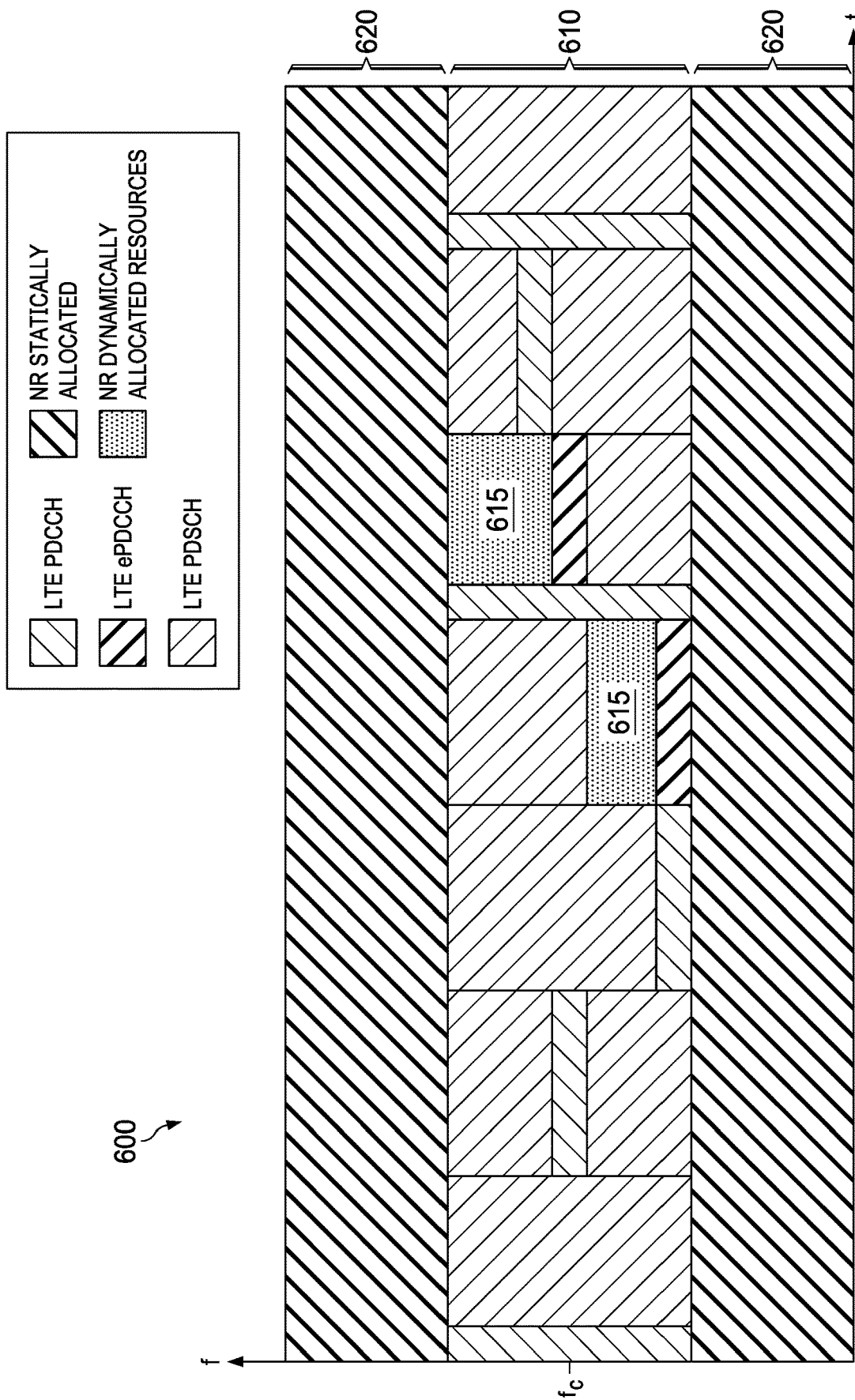
FIG. 6 is a diagram of another spectrum configured for the coexistence of NR and LTE air interfaces.

In some embodiments, an LTE subframe will include an LTE enhanced PDCCH (ePDCCH). The LTE ePDCCH may be similar to the LTE PDCCH, except that the LTE PDCCH may be time division duplexed (TDD) with the LTE PDSCH and the LTE ePDCCH may be frequency division duplexed (FDD) with the LTE PDSCH. FIG. 6 is a diagram of a spectrum 600 configured for the coexistence of NR and LTE air interfaces. Similar to FIG. 2, a central portion 610 of the spectrum 600 is licensed for LTE signal(s), and outer portions 620 of the spectrum 600 are statically allocated for NR signal. In some embodiments the size of the central portion of the band associated with LTE may be statically, semi-statically or dynamically resized based on the expected load of the LTE network. In this example, resources of the central portion 610 of the spectrum 600 are used for LTE PDCCH signal, LTE ePDCCH signal, and LTE PDSCH signal. Additionally, sets of resources 615 of the central portion 610 of the spectrum 600 that are not used for LTE PDCCH, LTE ePDCCH, or LTE PDSCH signal are dynamically allocated for NR signal.

Figure 7:
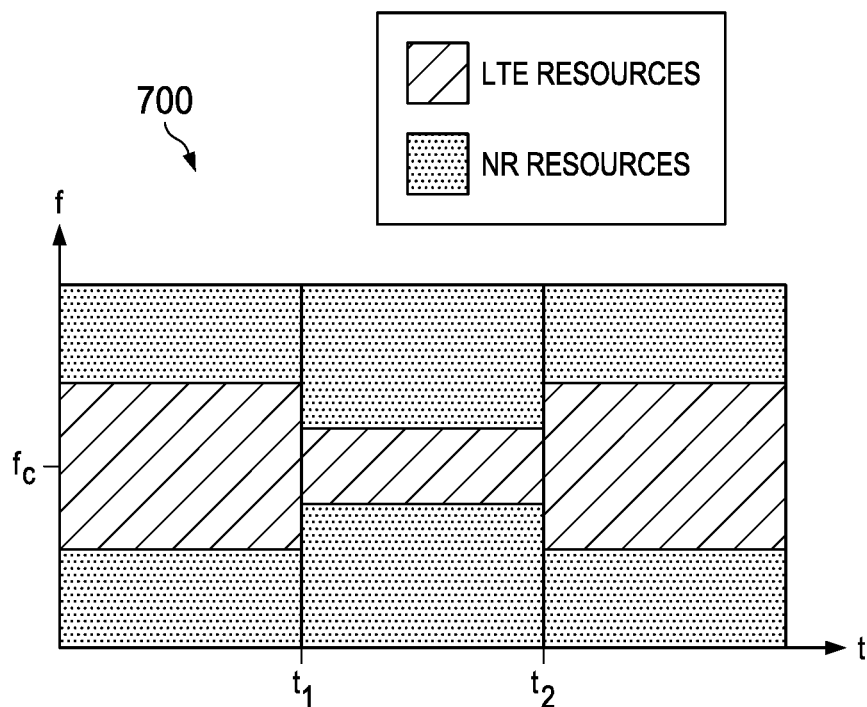
FIG. 7 is a diagram of a spectrum in which different frequency domain resources are allocated to NR and LTE air interfaces.

In some embodiments, LTE resources and NR resources are multiplexed in the frequency domain. In such embodiments, the spectrum allocation for LTE/NR resources can be updated dynamically and/or semi-statically. FIG. 7 is a diagram of a spectrum 700 in which different frequency domain resources are allocated to the NR and LTE air interfaces. As shown, the spectrum allocation for LTE and NR air interfaces is updated at a first time interval ($t_1$) such that at least some frequency sub-bands are re-allocated from the LTE air interface to the NR air interface. At a second time interval ($t_2$), those frequency sub-bands are allocated back to the LTE air interface.

Figure 8:
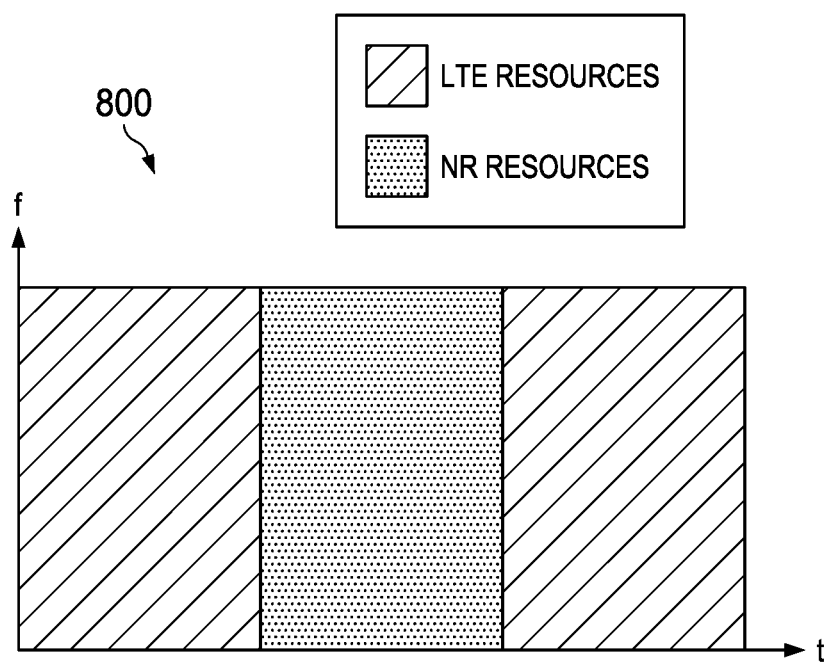
FIG. 8 is a diagram of a spectrum in which different time domain resources are allocated to the NR and LTE air interfaces.
Figure 9:
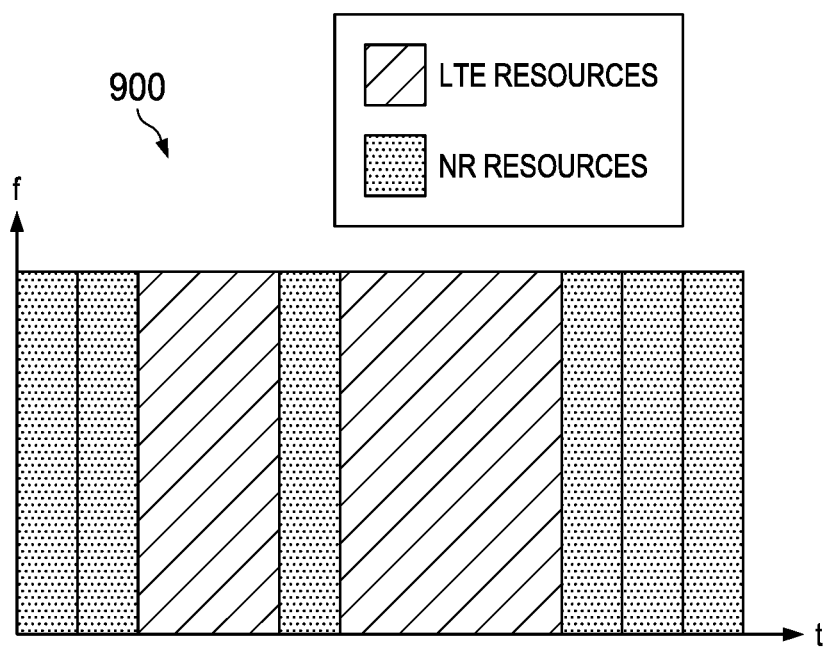
FIG. 9 is a diagram of another spectrum in which different time domain resources are allocated to the NR and LTE air interfaces.

In other embodiments, LTE resources and NR resources are multiplexed in the time domain. FIG. 8 is a diagram of a spectrum 800 in which different time domain resources are allocated to the NR and LTE air interfaces. In this example, orthogonal frequency division multiplexed (OFDM) symbols are semi-statically allocated to the LTE and NR air interfaces. In other examples, OFDM symbols are dynamically allocated to the LTE and NR air interfaces. FIG. 9 is a diagram of a spectrum 900 in which different time domain resources are allocated to the NR and LTE air interfaces. In this example, OFDM symbols are dynamically allocated to the LTE and NR air interfaces on a symbol-by-symbol basis.

Figure 10:
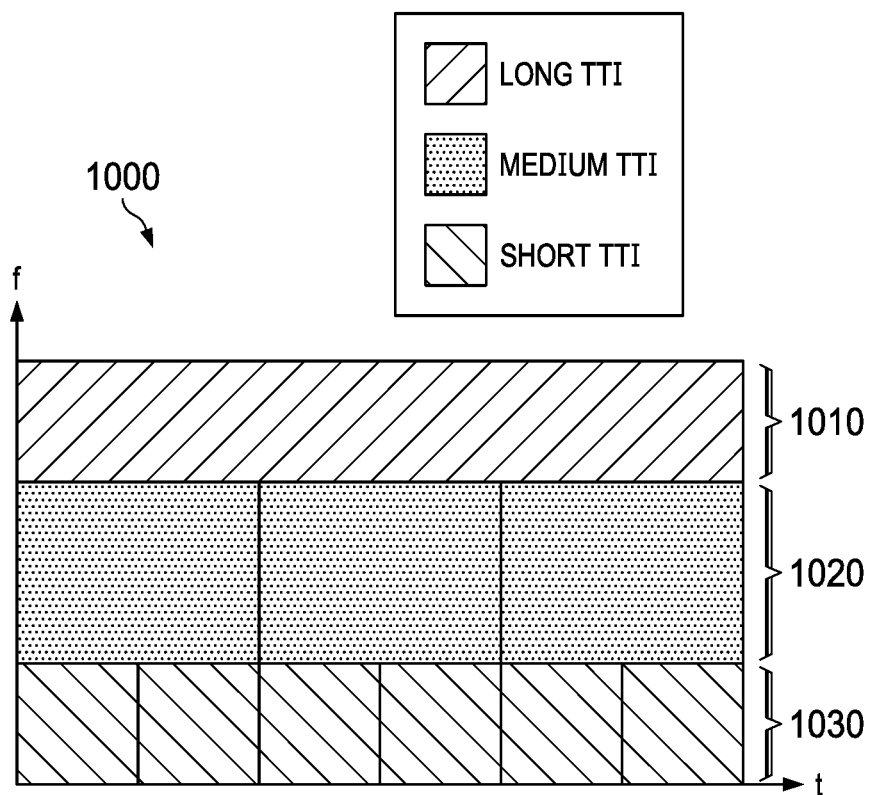
FIG. 10 is a diagram of a spectrum in which different length TTIs are used to transmit LTE and/or NR signals.

In some embodiments, different length time transmission intervals (TTIs) are used to transmit LTE and/or NR signal(s). FIG. 10 is a diagram of a spectrum 1000 in which different length TTIs are used to transmit LTE and/or NR signal(s). In this example, a long TTI is used to transmit signal over a portion 1010 of the spectrum 1000, a medium TTI is used to transmit signal over a portion 1020 of the spectrum 1000, and a short TTI is used to transmit signal over a portion 1030 of the spectrum 1000. The medium TTI may be the TTI length used in legacy 4G LTE networks.

Figure 11:
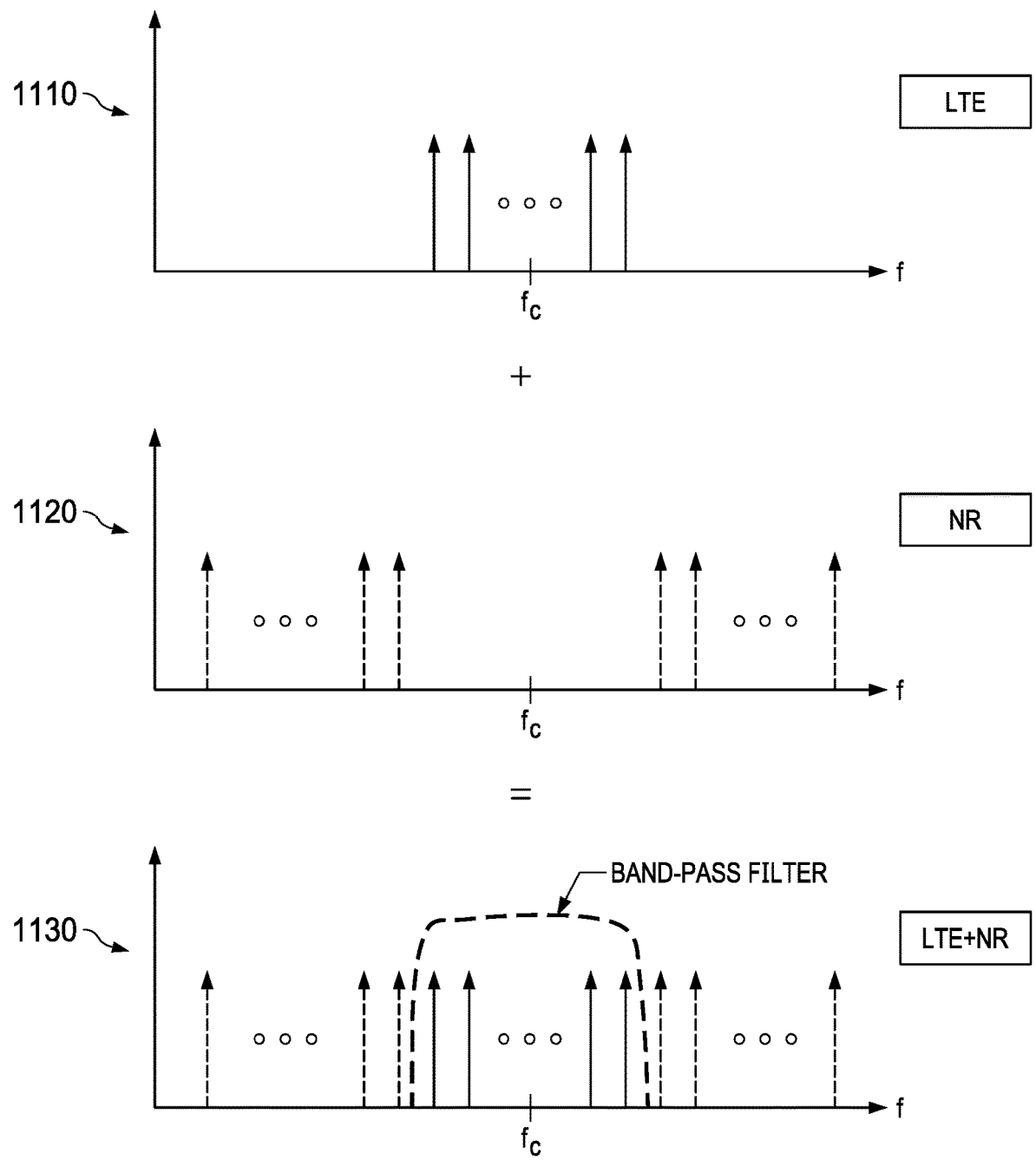
FIG. 11 is a diagram of another spectrum configured for the coexistence of NR and LTE air interfaces.

FIG. 11 is a diagram of a spectrum 1130 configured for the coexistence of NR and LTE air interfaces. As shown, the spectrum 1130 is the summation of center frequencies 1110 licensed for LTE signal(s) and outer frequencies 1120 licensed for NR signal. In this example, the center frequencies 1110 and the outer frequencies 1120 are separated by the LTE receiver using a band-pass filter.

Figure 12:
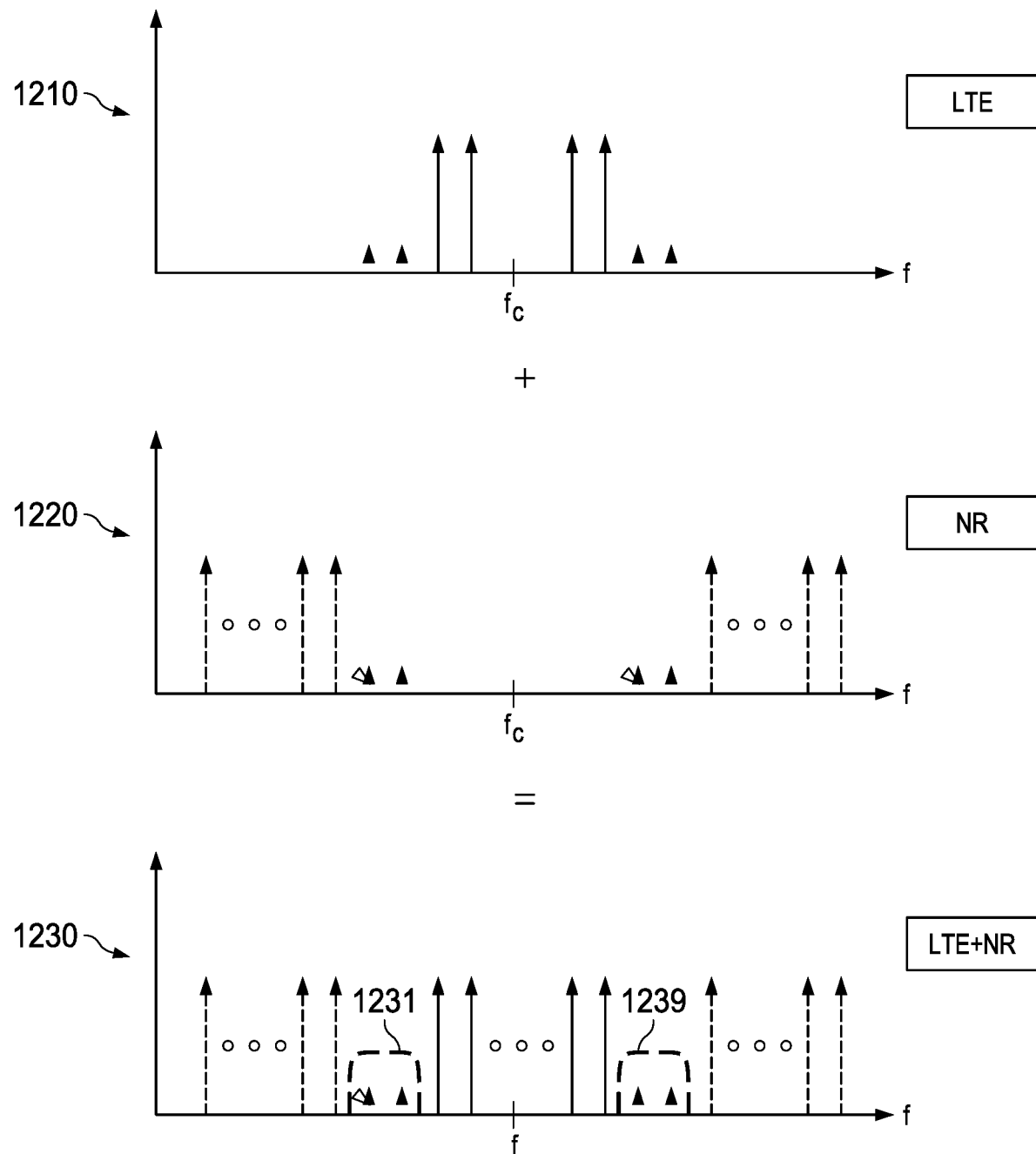
FIG. 12 is a diagram of yet another spectrum configured for the coexistence of NR and LTE air interfaces.

FIG. 12 is a diagram of a spectrum 1230 configured for the coexistence of NR and LTE air interfaces. As shown, the spectrum 1230 is the summation of center frequencies 1210 licensed for LTE signal(s) and outer frequencies 1220 licensed for NR signal. In this example, guard bands 1231, 1239 separate the center frequencies 1210 from the outer frequencies 1120.

Co-existence with LTE can be transparent to NR UEs not scheduled into the LTE region. Only NR UEs scheduled in the LTE regions need to be signaled in order to avoid CRS signal(s). The NR UEs can also take advantage of a flexible starting time of NR sub-frame in order to avoid an LTE control region at the beginning of an LTE sub-frame.

In some embodiments, NR networks may support software defined air interfaces that can be dynamically tailored to support diverse traffic types in order to balance latency and dynamic control signal overhead. In some embodiments, NR and LTE air interfaces may have intra-carrier coexistence such that the respective air interfaces are used to transport data over the same carrier frequency. The existence of the NR air interface may be transparent to LTE UEs. In some embodiments, NR APs/UEs may perform rate matching over resources in an LTE subframe that are dynamically allocated for NR signal to avoid interference with LTE reference and control signal.

FDM-based LTE/NR coexistence schemes may offer several benefits. For example, FDM-based LTE/NR coexistence schemes may permit flexible frequency-domain location of NR synchronization signal (SS) blocks and flexible time-domain starting point of NR sub-frames to avoid LTE control regions. One or multiple NR SS blocks may carry primary synchronization signal (PSS) symbols, secondary synchronization signal (SSS) symbols, and/or physical broadcast channel (PBCH). When multiple beam directions are used, multiple NR SS blocks that include SS bursts may be multiplexed over a group of resources. Also, with LTE signal(s) confined to the central portion of the spectrum, there may be little or no interference between LTE reference signal and NR SS blocks. Additional, FDM-based LTE/NR coexistence schemes may capitalize on the self-contained properties of NR unified soft-AI design where each part of the band can be flexibly configured with its own parameters, e.g., NR signal can flexibly occupy any left-over bandwidth not used by LTE, etc. Further, FDM-based LTE/NR coexistence schemes may rely on F-OFDM waveforms, rather than guard intervals and/or blanking of LTE signal(s). Additionally, FDM-based LTE/NR coexistence schemes may be transparent to NR UEs that are not scheduled in the central portion of the spectrum, e.g., the portion of the spectrum licensed for LTE signal(s).

Figure 13:
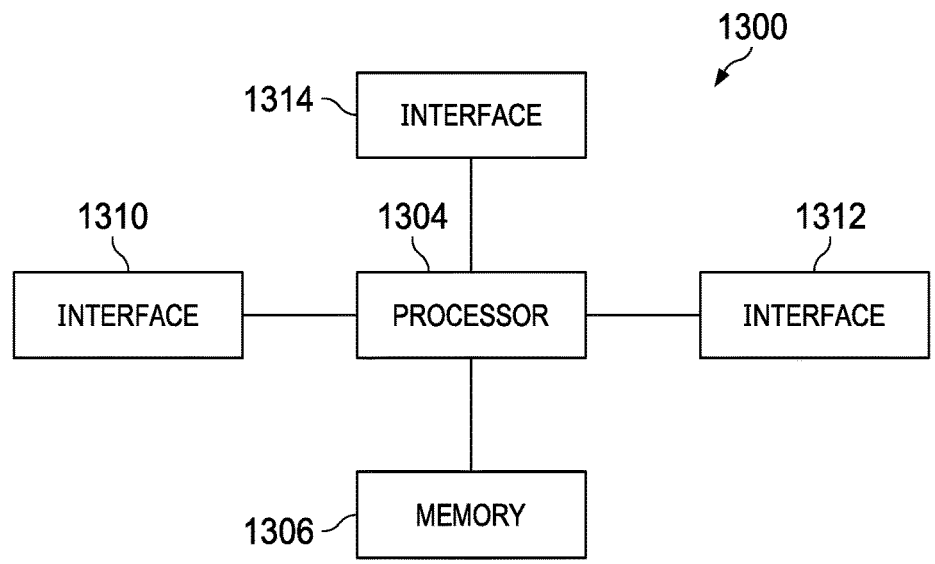
FIG. 13 is a block diagram of an embodiment processing system for performing methods described herein.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 33. The processor 1304 may be any component or collection of components adapted to perform computations and/or other processing related tasks, and the memory 1306 may be any component or collection of components adapted to store programming and/or instructions for execution by the processor 1304. A means for configuring a context for a UE may include processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
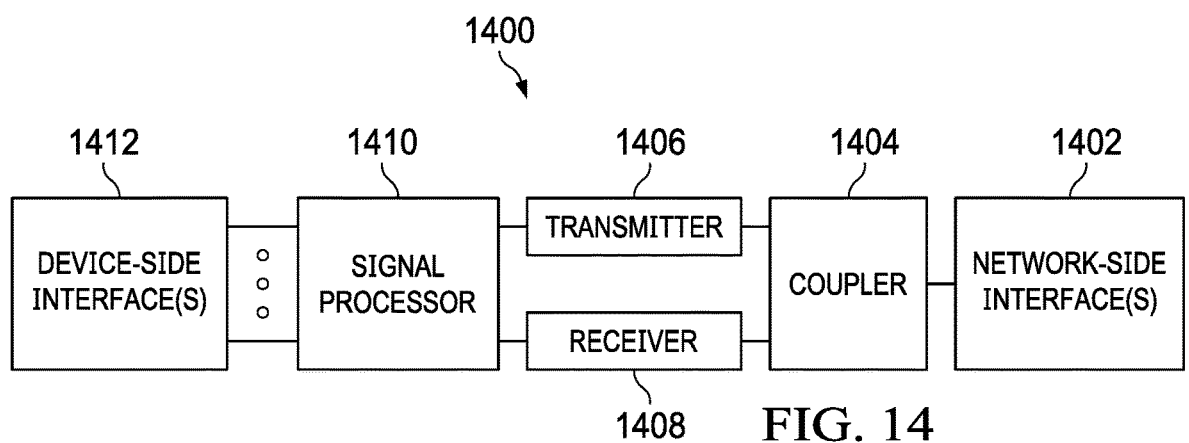
FIG. 14 is a block diagram of a transceiver adapted to transmit and receive signals over a telecommunications network according to example embodiments described herein.

In some embodiments, one or more of the interfaces 1310, 1312, 1314 connects the processing system 1300 to a transceiver adapted to transmit and receive signal over the telecommunications network. FIG. 14 illustrates a block diagram of a transceiver 1400 adapted to transmit and receive signal over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signal over a wireless or wireline telecommunications network. The network-side interface 1402 may also include any component or collection of components adapted to transmit or receive signal over a short-range interface. The network-side interface 1402 may also include any component or collection of components adapted to transmit or receive signal over a Uu interface. The coupler 1404 may include any component or collection of components adapted for bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. A means for transmitting an initial message of an access procedure may include transmitter 1406. The receiver 1408 may include any component or collection of components (e.g., down-converter, low noise amplifier, etc.) adapted to convert a carrier signal received over the network-side interface 1402 into a baseband signal. A means for receiving mobile subscriber identifiers, initial downlink messages of access procedures, and forwarded requests to connect to a network may include receiver 1408.

The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data signals between the signal processor 1410 and components within the host device (e.g., the processing system 1300, local area network (LAN) ports, etc.).

The transceiver 1400 may transmit and receive signal over any type of communications medium. In some embodiments, the transceiver 1400 transmits and receives signals over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signals over a wireline medium, e.g., twisted-pair cable, coaxial cable, optical fiber, etc. Specific processing systems and/or transceivers may utilize all of the components shown, or only a subset of the components, and levels of integration may vary from device to device.

Although the claimed concepts have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method comprising:
   receiving, by a User Equipment (UE), a New Radio (NR) control signal indicating a Long Term Evolution (LTE) network parameter;
   identifying, within a set of resources, a subset of resources carrying LTE signal(s) based on the LTE network parameter; and
   receiving, by the UE, an NR downlink signal over one or more resources, excluding the subset of resources, in the set of resources.

2. The method of claim 1, wherein the set of resources includes at least some resources that are allocated to the UE.

3. The method of claim 1, wherein the set of resources includes at least some control resource sets configured to the UE.

4. The method of claim 1, wherein the NR downlink signal is rate matched around the subset of resources carrying the LTE signal(s), and wherein the NR downlink signal is rate matched at the resource element (RE) level such that the subset of resources around which the NR downlink signal is rate matched consists of an integer number of resource elements (REs).

5. The method of claim 1, wherein the NR control signal indicates an LTE antenna port, wherein determining the subset of resources carrying LTE signal(s) comprises determining that the subset of resources includes resources carrying LTE reference signal(s) based on an LTE cell-specific reference signal (CRS) pattern associated with the LTE antenna port.

6. The method of claim 1, wherein the NR control signal indicates a frequency offset, wherein determining the subset of resources carrying LTE signal(s) comprises determining that the subset of resources includes resources carrying LTE reference signal(s) based on the frequency offset.

7. The method of claim 1, wherein the NR control signal indicates a number of Orthogonal Frequency Division Multiplexed (OFDM) symbols in an LTE control channel, wherein receiving the NR downlink signal over the one or more resources in the subset of resources comprises adjusting the start time for receiving an NR downlink signal for a period of time corresponding to the number of OFDM symbols in the LTE control channel.

8. The method of claim 1, wherein the NR control signal indicates an LTE Multicast-Broadcast Single-Frequency Network (MBSFN) configuration, wherein determining the subset of resources carrying LTE signal(s) comprises determining that the subset of resources includes resources carrying LTE MBSFN reference signal(s) based on the LTE MBSFN configuration.

9. The method of claim 1, wherein the NR control signal indicates an LTE Channel State Information Reference Signal (CSI-RS) configuration, and wherein determining the subset of resources carrying LTE signal(s) comprises determining that the subset of resources includes resources carrying LTE CSI-RS signal(s) based on the LTE CSI-RS configuration.

10. The method of claim 1, wherein receiving the NR downlink signal comprises:
    receiving one or more NR downlink signal(s) over the one or more resources, the one or more NR downlink signals having zero power levels over the subset of resources carrying the LTE signal(s), wherein the one or more NR downlink signals include an NR signal transmitted over a Physical Downlink Shared Channel (PDSCH), an NR control signal transmitted over a Physical Downlink Control Channel (PDCCH), an NR primary or secondary synchronization signal, an NR broadcast signal transmitted over an NR Physical Broadcast Channel (PBCH), or a combination thereof.

11. A method comprising:
    receiving, by a User Equipment (UE), a New Radio (NR) control signal indicating a Long Term Evolution (LTE) network parameter;
    identifying, within a set of resources, a subset of resources carrying, or otherwise reserved for, LTE signal(s) based on the LTE network parameter; and
    transmitting, by the UE, an NR uplink signal over one or more resources, excluding the subset of resources, in the set of resources.

12. The method of claim 1, wherein the set of resources includes at least some resources that are allocated to the UE.

13. The method of claim 1, wherein the set of resources includes at least some resources configured for uplink control signals.

14. The method of claim 1, wherein the NR uplink signal is rate matched around the subset of resources carrying, or otherwise reserved for, the LTE signal.

15. The method of claim 1, wherein determining the subset of resources carrying LTE signal(s) comprises:
    determining that at least some resources in the subset of resources are reserved for LTE Random Access Channel (RACH) transmissions based on the LTE network parameter in the NR control signal.

16. The method of claim 1, wherein determining the subset of resources carrying LTE signal(s) comprises:
    determining that at least some resources in the subset of resources carry LTE sounding reference signal (SRS) symbols based on the LTE network parameter in the NR control signal.

17. The method of claim 1, wherein determining the subset of resources carrying LTE signal(s) comprises:
    determining that at least some resources in the subset of resources carry LTE data signal transmitted over an NR physical uplink channel (PUSCH) or an NR control signal transmitted over an NR physical uplink control channel (PUCCH) based on the LTE network parameter in the NR control signal.

18. A User Equipment (UE) comprising:
    a processor; and
    a non-transitory computer readable storage medium storing programming for execution by the processor, the programming including instructions to:
    receive a New Radio (NR) control signal indicating a Long Term Evolution (LTE) network parameter;
    identify, within a set of resources, a subset of resources carrying, or otherwise reserved for, LTE signal(s) based on the LTE network parameter; and
    transmit an NR uplink signal over one or more resources, excluding the subset of resources, in the set of resources.

19. The UE of claim 18, wherein the set of resources includes at least some resources that are allocated to the UE.

20. The UE of claim 18, wherein the set of resources includes at least some resources configured for uplink control signals.

21. The UE of claim 18, wherein the NR uplink signal is rate matched around the subset of resources carrying, or otherwise reserved for, the LTE signal.

22. The UE of claim 18, wherein the instructions to determine the subset of resources carrying LTE signal(s) include instructions to:
    determine that at least some resources in the subset of resources are reserved for LTE Random Access Channel (RACH) transmissions based on the LTE network parameter in the NR control signal.

23. The UE of claim 18, wherein the instructions to determine the subset of resources carrying LTE signal(s) include instructions to:
    determine that at least some resources in the subset of resources carry LTE sounding reference signal (SRS) symbols based on the LTE network parameter in the NR control signal.

24. The UE of claim 18, wherein the instructions to determine the subset of resources carrying LTE signal(s) include instructions to:
    determine that at least some resources in the subset of resources carry LTE data signal transmitted over an NR physical uplink channel (PUSCH) or an NR control signal transmitted over an NR physical uplink control channel (PUCCH) based on the LTE network parameter in the NR control signal.

25. A User Equipment (UE) comprising:
    a processor; and
    a non-transitory computer readable storage medium storing programming for execution by the processor, the programming including instructions to:
    receive a New Radio (NR) control signal indicating a Long Term Evolution (LTE) network parameter;
    identify, within a set of resources, a subset of resources carrying LTE signal(s) based on the LTE network parameter; and
    receive an NR downlink signal over one or more resources, excluding the subset of resources, in the set of resources.

26. The UE of claim 25, wherein the set of resources includes at least some resources that are allocated to the UE.

27. The UE of claim 25, wherein the set of resources includes at least some control resource sets configured to the UE.

28. The UE of claim 25, wherein the NR downlink signal is rate matched around the subset of resources carrying the LTE signal(s), and wherein the NR downlink signal is rate matched at the resource element (RE) level such that the subset of resources around which the NR downlink signal is rate matched consists of an integer number of resource elements (REs).

29. The UE of claim 25, wherein the NR control signal indicates an LTE antenna port, wherein determining the subset of resources carrying LTE signal(s) comprises determining that the subset of resources includes resources carrying LTE reference signal(s) based on an LTE cell-specific reference signal (CRS) pattern associated with the LTE antenna port.

30. The UE of claim 25, wherein the NR control signal indicates a frequency offset, wherein determining the subset of resources carrying LTE signal(s) comprises determining that the subset of resources includes resources carrying LTE reference signal(s) based on the frequency offset.

31. The UE of claim 25, wherein the NR control signal indicates a number of Orthogonal Frequency Division Multiplexed (OFDM) symbols in an LTE control channel, wherein receiving the NR downlink signal over the one or more resources in the subset of resources comprises adjusting the start time for receiving an NR downlink signal for a period of time corresponding to the number of OFDM symbols in the LTE control channel.

32. The UE of claim 25, wherein the NR control signal indicates an LTE Multicast-Broadcast Single-Frequency Network (MBSFN) configuration, wherein determining the subset of resources carrying LTE signal(s) comprises determining that the subset of resources includes resources carrying LTE MBSFN reference signal(s) based on the LTE MBSFN configuration.

33. The UE of claim 25, wherein the NR control signal indicates an LTE Channel State Information Reference Signal (CSI-RS) configuration, and wherein determining the subset of resources carrying LTE signal(s) comprises determining that the subset of resources includes resources carrying LTE CSI-RS signal(s) based on the LTE CSI-RS configuration.

34. The UE of claim 25, wherein the instructions to receive the NR downlink signal include instructions to:

receive one or more NR downlink signal(s) over the one or more resources, the one or more NR downlink signals having zero power levels over the subset of resources carrying the LTE signal(s), wherein the one or more NR downlink signals include an NR signal transmitted over a Physical Downlink Shared Channel (PDSCH), an NR control signal transmitted over a Physical Downlink Control Channel (PDCCH), an NR primary or secondary synchronization signal, an NR broadcast signal transmitted over an NR Physical Broadcast Channel (PBCH), or a combination thereof.

35. The UE of claim 25, wherein the NR control signal is received over at least one of an NR downlink physical control channel and an NR physical broadcast channel (PBCH).

36. The UE of claim 25, wherein the NR control signal is included in remaining minimum system information (RMSI).

37. The UE of claim 25, wherein the NR control signal is received via a higher-layer Radio Resource Control (RRC) signal, a Media Access Control (MAC) control element (CE), or a combination thereof.

38. The method of claim 1, wherein the NR control signal is received over at least one of an NR downlink physical control channel and an NR physical broadcast channel (PBCH).

39. The method of claim 1, wherein the NR control signal is included in remaining minimum system information (RMSI).

40. The method of claim 1, wherein the NR control signal is received via a higher-layer Radio Resource Control (RRC) signal, a Media Access Control (MAC) control element (CE), or a combination thereof.

41. The method of claim 1, wherein the NR control signal indicates a frequency offset for adjusting the frequency misalignment due to different handling of DC subcarrier in NR and LTE.

42. The method of claim 32, wherein the NR control signal indicates a frequency offset for adjusting the frequency misalignment due to different handling of DC subcarrier in NR and LTE.

43. The UE of claim 39, wherein the NR control signal indicates a frequency offset for adjusting the frequency misalignment due to different handling of DC subcarrier in NR and LTE.

44. The UE of claim 25, wherein the NR control signal indicates a frequency offset for adjusting the frequency misalignment due to different handling of DC subcarrier in NR and LTE.

* * * * *